UNITED STATES PATENT OFFICE.

SIEGMUND RADLAUER, OF BERLIN, GERMANY.

PROCESS OF PREPARING A HYPNOTIC.

SPECIFICATION forming part of Letters Patent No. 422,251, dated February 25, 1890.

Application filed November 4, 1889. Serial No. 329,216. (No specimens.)

*To all whom it may concern:*

Be it known that I, SIEGMUND RADLAUER, a subject of the King of Prussia, German Empire, and resident of Berlin, Kingdom of Prussia, German Empire, have invented new and useful Improvements in and relating to the manufacture of a new Soporiferous Remedy, of which the following is a specification.

If equal quantities of urethane, chloral, and alcohol of ninety-six per cent. are allowed to act upon each other at a temperature of about one hundred degrees in a vacuum apparatus, a limpid solution of the clearness of water is produced in a short time, from which solution a finely-crystallized substance is eliminated in the cold. The empirical formula for this new substance is $C_7H_{12}Cl_3O_3N$. The substance therefore differs from the chloral-urethane heretofore known, in that it contains the additional quantity of $C_2H_4$. Its melting-point is 42° centigrade, and it boils in a vacuum at about 145° centigrade. To purify the product, it can be crystallized several times in water. This substance readily dissolves in water and alcohol. The alcoholic solution produced according to the above-described process serves for direct use, if necessary, diluted.

The remedy has been administered according to the following prescription: Of the crystals, ten parts; distilled water, forty-five parts; solution of licorice or raspberry sirup, twenty parts, in table-spoon doses, (containing two grams.) One-half hour after its administration a sound sleep, lasting from six to eight hours, is produced without the objectionable after effects of chloral hydrate or urethane.

What I claim is—

The process of preparing a hypnotic, consisting in allowing equal quantities of chloral-urethane and alcohol of ninety-six per cent. to act upon each other in a vacuum apparatus at a temperature of about 100° centigrade, and then crystallizing the same in water, substantially as described.

In witness whereof I have hereunto set my hand in presence of two witnesses.

SIEGMUND RADLAUER.

Witnesses:
   GEO. H. MURPHY,
   A. SIEBER.